(12) United States Patent
Schirp et al.

(10) Patent No.: US 7,765,702 B2
(45) Date of Patent: Aug. 3, 2010

(54) ANGLE SENSOR

(75) Inventors: Christian Schirp, Witten (DE); Arnd Ruebenhagen, Dinslaken (DE); Oliver Maier, Attendorn (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 197 days.

(21) Appl. No.: 12/240,063

(22) Filed: Sep. 29, 2008

(65) Prior Publication Data

US 2009/0031569 A1 Feb. 5, 2009

Related U.S. Application Data

(63) Continuation-in-part of application No. PCT/EP2007/004430, filed on May 16, 2007.

(30) Foreign Application Priority Data

May 18, 2006 (DE) .................. 10 2006 023 286

(51) Int. Cl.
G01B 7/00 (2006.01)
(52) U.S. Cl. .................. 33/1 N; 33/1 PT; 73/117.02
(58) Field of Classification Search .................. 33/1 N, 33/1 PT, 534, 501.7, 600; 74/445; 341/2; 73/117.02
See application file for complete search history.

(56) References Cited

U.S. PATENT DOCUMENTS

| | | | |
|---|---|---|---|
| 3,396,594 A | 8/1968 | Walker | |
| 5,771,745 A | 6/1998 | Goette et al. | |
| 5,930,905 A | 8/1999 | Zabler et al. | |
| 6,155,106 A * | 12/2000 | Sano | 73/117.02 |
| 6,481,272 B1 * | 11/2002 | Kieselbach | 73/117.02 |
| 6,546,780 B1 * | 4/2003 | Palfenier et al. | 73/1.75 |
| 6,552,533 B2 | 4/2003 | Schodlbauer et al. | |
| 6,861,837 B1 * | 3/2005 | Shimizu et al. | 324/207.25 |
| 6,983,647 B2 * | 1/2006 | Nagaoka et al. | 73/117.02 |
| 7,017,274 B2 | 3/2006 | Stobbe | |
| 7,040,025 B2 * | 5/2006 | Inoue | 33/1 PT |
| 7,637,020 B2 * | 12/2009 | Maier et al. | 33/1 PT |
| 7,726,431 B2 * | 6/2010 | Manken et al. | 180/253 |
| 2003/0056583 A1 | 3/2003 | Schodlbauer et al. | |

FOREIGN PATENT DOCUMENTS

| | | |
|---|---|---|
| DE | 1 967 959 | 9/1967 |
| DE | 196 16 503 | 11/1996 |
| DE | 10 2004 021 405 | 7/2005 |
| EP | 1 132 716 | 9/2001 |

* cited by examiner

*Primary Examiner*—G. Bradley Bennett
*Assistant Examiner*—Tania C Courson
(74) *Attorney, Agent, or Firm*—Brooks Kushman P.C.

(57) ABSTRACT

An angle sensor includes two measuring pinions which rotate in the same direction in response to a drive pinion rotating. The measuring pinions have different absolute angular positions after rotating. The absolute angular position of the drive pinion is determinable from the absolute angular positions of the measuring pinions. A delta wheel between the measuring pinions has two coaxially arranged rings. One ring engages the second measuring pinion and the other ring engages the first measuring pinion such that the rings rotate relative to one another in the same direction in response to the measuring pinions rotating in the opposite direction. A spring connecting the rings together biases the rings to move in opposite directions toward one another after the rings have been rotated relative to one another in the same direction such that the rings respectively press the measuring pinions against the drive pinion.

11 Claims, 1 Drawing Sheet

ANGLE SENSOR

CROSS-REFERENCE TO RELATED APPLICATIONS

This is a continuation-in-part of International Application PCT/EP2007/004430, published in German, with an international filing date of May 16, 2007, which claims priority to DE 10 2006 023 286.0, filed May 18, 2006; the disclosures of which are both hereby incorporated by reference.

BACKGROUND OF THE INVENTION

1. Field of the Invention

The present invention relates to an angle sensor having a drive pinion and two measuring pinions driven by the drive pinion in which the absolute angular position of the drive pinion can be determined from the absolute angular positions of the measuring pinions.

2. Background Art

EP 0 877 916 B1 (corresponding to U.S. Pat. No. 5,930,905) describes an angle sensor having a drive pinion and two measuring pinions driven by the drive pinion. The drive pinion is connected to a steering column. The pinions have a different number of teeth from one another. The sensor determines the absolute angular position of the steering column in a measurement region exceeding 360° (i.e., in a measurement range exceeding one full rotation of the steering column) by evaluating the beat angle according to the Nonius principle. The measuring pinions exhibit backlash from being engaged with the drive pinion which leads to hysteresis. Grease may be used to reduce the backlash. However, the elimination of backlash cannot be guaranteed over the operating temperature range and lifetime of the sensor.

EP 1 132 716 A1 (corresponding to U.S. Pat. No. 6,552,533) describes an angle sensor having a measuring pinion engaged without backlash to a drive pinion through a spring-loaded bearing. The sensor behaves the same way in the arrangements of EP 1 391 696 A2 (corresponding to U.S. Pat. No. 7,017,274). One arrangement pays for the elimination of hysteresis with a large measurement error as the measuring pinion and its axle to which a pickup element is coupled are thereby displaced with respect to the sensor axle. In the other arrangement, a safety problem can occur due to the indirect coupling of the measuring pinion as gear teeth can be jumped over as a result of the coupling flexibility.

SUMMARY OF THE INVENTION

An object of the present invention includes a simple and cost-effective low-hysteresis angle sensor that avoids the aforementioned disadvantages.

In carrying out the above object and other objects, the present invention provides an angle sensor. The angle sensor includes a drive pinion, a first measuring pinion, a second measuring pinion, and a delta wheel. The drive pinion is rotatable about a rotational axis. The first measuring pinion is rotatable about a first rotational axis parallel to the rotational axis of the drive pinion. The second measuring pinion is rotatable about a second rotational axis parallel to the rotational axis of the drive pinion. The measuring pinions engage the drive pinion such that the measuring pinions rotate in the same direction in response to the drive pinion rotating. The measuring pinions being configured differently from one another such that the measuring pinions have different absolute angular positions from one another after rotating in response to the drive pinion rotating. The absolute angular position of the drive pinion is determinable from the absolute angular positions of the measuring pinions.

The delta wheel is between the measuring pinions. The delta wheel has first and second coaxially arranged ring gears which are rotatable about a rotational axis parallel to the rotational axis of the drive pinion. The first ring gear engages the second measuring pinion and the second ring gear engages the first measuring pinion such that the ring gears rotate in the same direction in response to the measuring pinions rotating in the opposite direction. The ring gears are configured differently from one another such that the ring gears rotate relative to one another in the same direction in response to the measuring pins rotating in the opposite direction. The delta wheel further includes a coupling element which connects the ring gears together. The coupling element biases the ring gears to move in opposite directions toward one another after the ring gears have been rotated relative to one another in the same direction such that the first ring gear presses the second measuring pinion against the drive pinion and the second ring gear presses the first measuring pinion against the drive pinion while the ring gears are rotated relative to one another in the same direction.

An angle sensor in accordance with embodiments of the present invention includes a drive pinion, first and second measuring pinions, and a delta wheel. The measuring pinions engage the drive pinion. The delta wheel includes two coaxially arranged ring gears. The ring gears respectively engage the measuring pinions. The delta wheel continuously presses the measuring pinions against of the drive pinion. This reduces backlash. For this purpose, the delta wheel further includes a stretchable spring or a viscous, frictional, or magnetic clutch connects the ring gears to one another. The ring gears can be moved move with respect to one another only by the application of force. The angle sensor has an angular measuring range exceeding one full rotation. The number of full rotations of the drive pinion can be determined from the position of the two measuring pinions.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
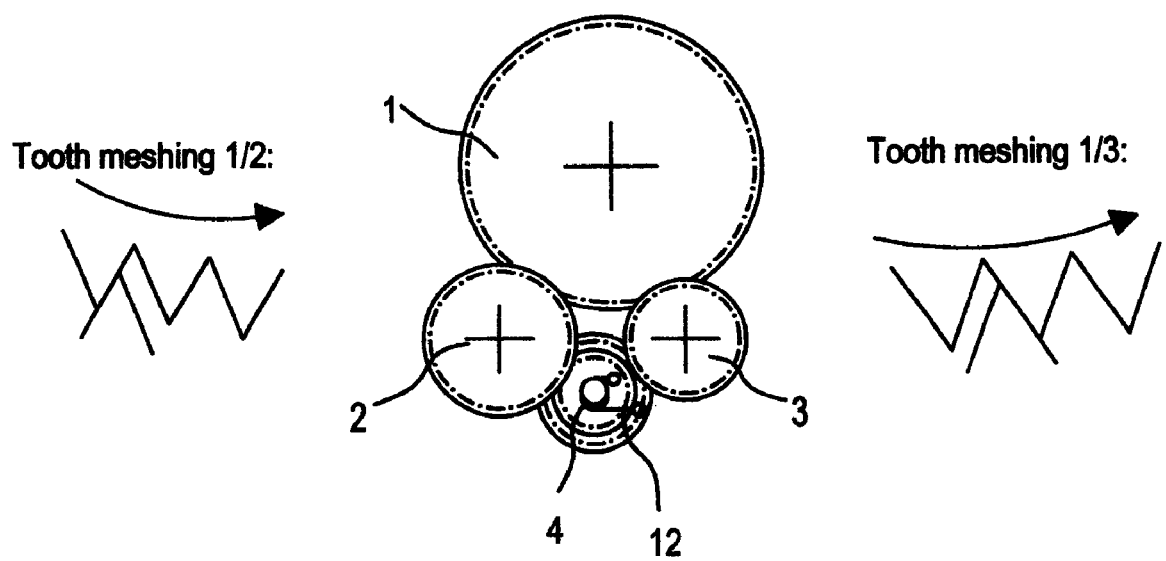
FIG. 1 illustrates the gearing assembly of an angle sensor in accordance with an embodiment of the present invention.

Referring now to FIG. 1, the gearing assembly of an angle sensor in accordance with an embodiment of the present invention is shown. The gearing assembly of the angle sensor includes a drive pinion 1. Drive pinion 1 is rotatable about a rotational axis and is coupled to a rotatable object in order to provide an indication of the absolute angular position of the rotatable object. For example, the rotatable object is the steering column of a vehicle and the angle sensor is used to detect the steering angle of the steering column.

The absolute angular position of a rotatable object is the angle separating the position of the object from a fixed reference position. As such, the absolute angular position of drive pinion 1 is indicative of the absolute angular position of the rotatable object to which drive pinion 1 is coupled.

The gearing assembly of the angle sensor further includes a first measuring pinion 2 and a second measuring pinion 3. First measuring pinion 2 is rotatable about a first rotational axis and second measuring pinion 3 is rotatable about a second rotational axis. The rotational axis of drive pinion 1 and the rotational axes of measuring pinions 2, 3 are parallel to one another.

Drive pinion 1 has a larger circumference than the circumferences of measuring pinions 2, 3. Drive pinion 1 has a plurality of teeth, first measuring pinion 2 has a first plurality of teeth, and second measuring pinion 3 has a second plurality of teeth. Drive pinion 1 has more teeth than each of measuring pinions 2, 3 and measuring pinions 2, 3 have different numbers of teeth from one another.

Drive pinion 1 engages first measuring pinion 2 such that first measuring pinion 2 rotates as drive pinion 1 rotates. In particular, teeth of drive pinion 1 engage with teeth of first measuring pinion 2 such that drive pinion 1 and first measuring pinion 2 engage one another. Likewise, drive pinion 1 engages second measuring pinion 3 such that second measuring pinion 3 rotates as drive pinion 1 rotates. Again, teeth of drive pinion 1 engage with teeth of second measuring pinion 3 such that drive pinion 1 and second measuring pinion 3 engage one another. Electronic sensors may respectively be connected to measuring pinions 2, 3 for detecting the absolute angular positions, or change in angular positions, of measuring pinions 2, 3.

The coupling of first measuring pinion 2 to drive pinion 1 and the coupling of second measuring pinion 3 to drive pinion 1 are carried out with different gear ratios as measuring pinions 2, 3 have different numbers of teeth. As a result, measuring pinions 2, 3 are moved through different rotational angles for a given rotation of drive pinion 1.

The absolute angular position of drive pinion 1 can be determined over a plurality of rotations of drive pinion 1 from the absolute angular positions of measuring pinions 2, 3 using the Nonius principle. However, the precision that can be achieved in the determination of the absolute angular position of drive pinion 1 is limited by the backlash occurring as a result of the engagement of measuring pinions 2, 3 with drive pinion 1.

Tolerances in the dimensions of pinions 1, 2, 3 have to be maintained to prevent seizing of pinions 1, 2, 3. As both measuring pinions 2, 3 exhibit backlash when they engage with drive pinion 1 the possible error increases accordingly.

The angle sensor solves the problem of the absolute angular position determination of drive pinion 1 (and hence the rotatable object coupled to drive pinion 1) being limited due to the backlash created from the engagement of measuring pinions 2, 3 with drive pinion 1. To this end, the angle sensor further includes a delta wheel 4. Delta wheel 4 is introduced between measuring pinions 2, 3.

Figure 2:
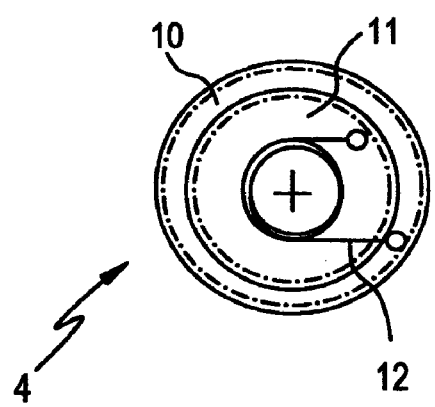
FIG. 2 illustrates the delta wheel of the angle sensor shown in FIG. 1.

Referring now to FIG. 2, with continual reference to FIG. 1, an embodiment of delta wheel 4 is shown. Delta wheel 4 includes a first ring gear 10 and a second ring gear 11. Ring gears 10, 11 are coaxially arranged with respect to one another and can rotate relative to one another about a rotational axis. The rotational axis of ring gears 10, 11 is parallel to the rotational axes of drive pinion 1 and measuring pinions 2, 3. Ring gears 10, 11 have a different number of teeth from one another.

Delta wheel 4 is introduced between measuring pinions 2, 3. Ring gears 10, 11 respectively engage measuring pinions 2, 3. As shown in FIG. 1 with reference to FIG. 2, first ring gear 10 engages second measuring pinion 3 and second ring gear 11 engages first measuring pinion 2. In particular, teeth of first ring gear 10 engage with teeth of second measuring pinion 3 such that first ring gear 10 is engaged with second measuring pinion 3, and teeth of second ring gear 11 engage with teeth of first measuring pinion 2 such that second ring gear 11 is engaged with first measuring pinion 2.

The following is an example gear design of the angle sensor:

| | |
|---|---|
| Drive pinion 1: | 87 teeth |
| First measuring pinion 2: | 29 teeth |
| Second measuring pinion 3: | 30 teeth |
| First ring gear 10: | 29 teeth |
| Second ring gear 11: | 30 teeth |

As such, in this embodiment, first ring gear 10 which engages second measuring pinion 3 has the same number of teeth as first measuring pinion 2. Likewise, second ring gear 11 which engages first measuring pinion 2 has the same number of teeth as second measuring pinion 3. Again, measuring pinions 2, 3 have a different number of teeth from one another. Correspondingly, ring gears 10, 11 have a different number of teeth from one another.

First ring gear 10 rotates as second measuring pinion 3 rotates and second ring gear 11 rotates as first measuring pinion 2 rotates. Ring gears 10, 11 rotate in the same direction in response to measuring pinions 2, 3 rotating. Ring gears 10, 11 rotate relative to one another in the same direction as a result of ring gears 10, 11 and measuring pinions 2, 3 having different numbers of teeth.

As an example, drive pinion 1 rotates in the clockwise direction and measuring pinions 2, 3 rotate in the counter-clockwise direction in response to the clockwise rotation of drive pinion 1. First ring gear 10 rotates in the clockwise direction in response to the counter-clockwise rotation of second measuring pinion 3. Likewise, second ring gear 11 rotates in the clockwise direction in response to the counter-clockwise rotation of first measuring pinion 2. The ring gear of ring gears 10, 11 having the most teeth rotates less than the other ring gear. Similarly, the ring gear of ring gears 10, 11 having the least teeth rotates more than the other ring gear. Consequently, as ring gears 10, 11 have a different amount of teeth from one another, ring gears 10, 11 rotate relative to one another in the same direction in response to rotation of measuring pinions 2, 3.

Delta wheel 4 further includes a spring 12. Spring 12 connects ring gears 10, 11 together. One end of spring 12 is connected to first ring gear 10 and the other end of spring 12 is connected to second ring gear 11 with the body of spring 12 being wrapped around the rotational axis of ring gears 10, 11. Spring 12 presses ring gears 10, 11 against one another such that ring gears 10, 11 press teeth of measuring pinions 2, 3 against opposing teeth edges of drive pinion 1. In particular, spring 12 stretches in response to ring gears 10, 11 rotating with respect to one another. The reaction of the spring force on ring gears 10, 11 produces a torque that presses teeth of measuring pinion 2, 3 against opposing teeth edges of drive pinion 1 (see FIG. 1).

When the direction of rotation is reversed, no tooth backlash and consequently no hysteresis are present because of the stretching of spring 12. Spring 12 ideally is stretchable over the entire measurement range. Ring gears 10, 11 may include stops to limit the rotational range of ring gears 10, 11 in order to prevent the destruction of spring 12 caused by over-stretching.

Spring 12 can compensate for a twisting angle on the order of magnitude of half a revolution. In order to prevent exceeding the limit of spring 12, and destroying the angle sensor in the process, stops are added on delta wheel 4 to limit the twisting angle. In an alternative embodiment, a frictional coupling element which requires no such protection from excessive twisting is used to connect ring gears 10, 11 instead of spring 12.

With reference to the above gear design example, when drive pinion 1 is rotated through five full rotations (i.e., 1800°), first measuring pinion 2 rotates 15.0 rotations (as first measuring pinion 2 has exactly ⅓ as many teeth of drive pinion 1) and second measuring pinion 3 rotates 14.5 rotations as second measuring pinion 3 has one more tooth than first measuring pinion 2. Sensor electronics associated with measuring pinions 2, 3 determines the absolute angular position (or, in this case, the number of full rotations of drive pinion 1) from the rotation difference (i.e., absolute angular position) between measuring pinions 2, 3.

Embodiments of an angle sensor in accordance with the present invention are not restricted to designs having different measuring pinions as designs having equal-sized measuring pinions are contemplated. In addition, arrangements in which the two measuring pinions are driven indirectly by a worm gear are contemplated.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An angle sensor comprising:
a drive pinion rotatable about a rotational axis;
a first measuring pinion rotatable about a first rotational axis parallel to the rotational axis of the drive pinion;
a second measuring pinion rotatable about a second rotational axis parallel to the rotational axis of the drive pinion;
wherein the measuring pinions engage the drive pinion such that the measuring pinions rotate in the same direction in response to the drive pinion rotating;
the measuring pinions being configured differently from one another such that the measuring pinions have different absolute angular positions from one another after rotating in response to the drive pinion rotating, wherein the absolute angular position of the drive pinion is determinable from the absolute angular positions of the measuring pinions;
a delta wheel between the measuring pinions, the delta wheel having first and second ring gears coaxially arranged and rotatable about a rotational axis parallel to the rotational axis of the drive pinion, wherein the first ring gear engages the second measuring pinion and the second ring gear engages the first measuring pinion such that the ring gears rotate in the same direction in response to the measuring pinions rotating in the opposite direction;
the ring gears being configured differently from one another such that the ring gears rotate relative to one another in the same direction in response to the measuring pins rotating in the opposite direction;
the delta wheel further including a coupling element which connects the ring gears together, wherein the coupling element biases the ring gears to move in opposite directions toward one another after the ring gears have been rotated relative to one another in the same direction such that the first ring gear presses the second measuring pinion against the drive pinion and the second ring gear presses the first measuring pinion against the drive pinion while the ring gears are rotated relative to one another in the same direction.

2. The angle sensor of claim 1 wherein:
the coupling element includes a spring, wherein one end of the spring is connected to the first ring gear and the other end of the spring is connected to the second ring gear.

3. The angle sensor of claim 1 wherein:
the coupling element includes a viscous coupling element.

4. The angle sensor of claim 1 wherein:
the coupling element includes a frictional coupling element.

5. The angle sensor of claim 1 wherein:
the coupling element includes a magnetic coupling element.

6. The angle sensor of claim 1 wherein:
the delta wheel further includes stops for limiting the relative rotation of the ring gears in the same direction with respect to one another.

7. The angle sensor of claim 1 wherein:
the drive pinion, the first and second measuring pinions, and the first and second ring gears each have teeth, wherein the drive pinion, the first and second measuring pinions, and the first and the first and second ring gears engage one another through the teeth.

8. The angle sensor of claim 7 wherein:
the first ring gear has a different amount of teeth than the second ring gear.

9. The angle sensor of claim 8 wherein:
the first ring gear has the same amount of teeth as the first measuring pinion and the second ring gear has the same amount of teeth as the second measuring pinion.

10. The angle sensor of claim 9 wherein:
the drive pinion has more teeth than the first and second ring gears and the first and second measuring pinions.

11. The angle sensor of claim 1 wherein:
the angle sensor is a steering angle sensor in a vehicle.

* * * * *